United States Patent
Keeling et al.

(10) Patent No.: US 9,679,695 B2
(45) Date of Patent: Jun. 13, 2017

(54) TUNING CIRCUIT AND METHOD FOR WIRELESS POWER TRANSFER SYSTEMS

(71) Applicant: QUALCOMM Incorporated, San Diego, CA (US)

(72) Inventors: Nicholas A. Keeling, Auckland (NZ); Jonathan Beaver, Auckland (NZ); Michael Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 13/725,346

(22) Filed: Dec. 21, 2012

(65) Prior Publication Data

US 2014/0015327 A1    Jan. 16, 2014

Related U.S. Application Data

(60) Provisional application No. 61/672,249, filed on Jul. 16, 2012.

(51) Int. Cl.
*H02J 50/00* (2016.01)
*H02J 50/10* (2016.01)
(Continued)

(52) U.S. Cl.
CPC ............. *H01F 38/14* (2013.01); *B60L 3/0046* (2013.01); *B60L 3/04* (2013.01); *B60L 11/14* (2013.01);
(Continued)

(58) Field of Classification Search
CPC . H01F 38/14; H02J 17/00; H02J 50/00; H02J 50/10; H02J 50/12; H02J 5/005;
(Continued)

(56) References Cited

U.S. PATENT DOCUMENTS

| 6,563,235 B1* | 5/2003 | McIntyre et al. ............. 307/109 |
| 2007/0086224 A1* | 4/2007 | Phadke ................. H02M 3/285 363/65 |

(Continued)

FOREIGN PATENT DOCUMENTS

| CN | 102013736 A | 4/2011 |
| WO | 2011135571 A2 | 11/2011 |

(Continued)

OTHER PUBLICATIONS

North Carolina State University, "Getting in Tune: Researchers solve tuning problem for wireless power transfer systems." PHYSorg.com., May 15, 2012; online: http://phys.org/news/2012-05-tune-tuning-problem-wireless-ower.html; pp. 2.

(Continued)

*Primary Examiner* — Rexford Barnie
*Assistant Examiner* — Thai Tran
(74) *Attorney, Agent, or Firm* — Knobbe, Martens, Olson & Bear, LLP

(57) ABSTRACT

This disclosure provides systems, methods and apparatus for wireless power transfer and particularly wireless power transfer to remote systems such as electric vehicles. In one aspect, a wireless power transfer system includes a transmitter and a receiver. The transmitter includes a first inductive element and a current generator. The current generator supplies a current to the first inductive element to generate an electromagnetic field. The receiver includes a second inductive element, a tuning circuit, and a controller. The second inductive element receives wireless power from the electromagnetic field. The tuning circuit has a reactance and includes a plurality of capacitive elements connected to the second inductive element. The plurality of capacitive elements supply an output current to a load. The controller selectively connects the plurality of capacitive elements in a (Continued)

plurality of configurations. The tuning circuit has substantially the same reactance in each of the plurality of configurations.

24 Claims, 13 Drawing Sheets

(51) Int. Cl.
  *H02J 50/12*   (2016.01)
  *H01F 38/14*   (2006.01)
  *B60L 11/18*   (2006.01)
  *H02J 5/00*   (2016.01)
  *H02J 17/00*   (2006.01)
  *B60L 3/00*   (2006.01)
  *B60L 3/04*   (2006.01)
  *B60L 11/14*   (2006.01)

(52) U.S. Cl.
CPC ......... *B60L 11/182* (2013.01); *B60L 11/1803* (2013.01); *B60L 11/1824* (2013.01); *B60L 11/1829* (2013.01); *B60L 11/1833* (2013.01); *B60L 11/1842* (2013.01); *B60L 11/1844* (2013.01); *B60L 11/1846* (2013.01); *B60L 11/1877* (2013.01); *H02J 5/005* (2013.01); *H02J 17/00* (2013.01); *B60L 2200/12* (2013.01); *B60L 2200/22* (2013.01); *B60L 2210/30* (2013.01); *B60L 2210/40* (2013.01); *B60L 2230/16* (2013.01); *B60L 2240/36* (2013.01); *B60L 2250/16* (2013.01); *B60L 2270/147* (2013.01); *B60L 2270/32* (2013.01); *B60L 2270/34* (2013.01); *Y02E 60/721* (2013.01); *Y02T 10/70* (2013.01); *Y02T 10/7005* (2013.01); *Y02T 10/705* (2013.01); *Y02T 10/7077* (2013.01); *Y02T 10/7088* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC .................. H02J 7/025; B60L 11/182; B60L 11/1829–11/1831; Y02T 90/122
USPC ....... 307/104, 109, 110; 363/21.02; 320/108
See application file for complete search history.

(56) References Cited

U.S. PATENT DOCUMENTS

| | | | |
|---|---|---|---|
| 2009/0296429 A1* | 12/2009 | Cook ...................... | H02M 1/34 363/40 |
| 2010/0164295 A1* | 7/2010 | Ichikawa et al. ............ | 307/104 |
| 2010/0201311 A1* | 8/2010 | Kirby et al. ................. | 320/108 |
| 2011/0031956 A1* | 2/2011 | Athas et al. ................. | 323/364 |
| 2011/0049995 A1* | 3/2011 | Hashiguchi .................. | 307/104 |
| 2011/0127846 A1* | 6/2011 | Urano .......................... | 307/104 |
| 2011/0149607 A1* | 6/2011 | Jungreis .............. | H02M 3/3376 363/21.02 |
| 2011/0193416 A1* | 8/2011 | Campanella ............ | H01Q 7/00 307/104 |
| 2011/0234011 A1* | 9/2011 | Yi ........................... | H02J 5/005 307/104 |
| 2011/0241439 A1* | 10/2011 | Urano .......................... | 307/104 |
| 2011/0304216 A1 | 12/2011 | Baarman | |
| 2011/0305047 A1* | 12/2011 | Jungreis ................. | H02M 1/08 363/21.02 |
| 2012/0038220 A1 | 2/2012 | Kim et al. | |
| 2012/0049861 A1 | 3/2012 | Kim et al. | |
| 2012/0056486 A1 | 3/2012 | Endo et al. | |
| 2012/0293006 A1* | 11/2012 | Kim et al. .................... | 307/104 |

FOREIGN PATENT DOCUMENTS

| | | |
|---|---|---|
| WO | WO-2012020475 A1 | 2/2012 |
| WO | 2012037444 A2 | 3/2012 |

OTHER PUBLICATIONS

International Search Report and Written Opinion—PCT/US2013/047840—ISA/EPO—Dec. 2, 2013.

* cited by examiner

TUNING CIRCUIT AND METHOD FOR WIRELESS POWER TRANSFER SYSTEMS

CROSS REFERENCE TO RELATED APPLICATIONS

This application claims benefit under 35 U.S.C. §119(e) to U.S. Provisional Patent Application No. 61/672,249 entitled "TUNING CIRCUIT AND METHOD FOR WIRELESS POWER TRANSFER SYSTEMS" filed on Jul. 16, 2012; the disclosure of which is hereby incorporated by reference in its entirety.

FIELD

The present disclosure relates generally to wireless power transfer, and more specifically to devices, systems, and methods related to wireless power transfer to remote systems, such as vehicles including batteries, and tuning circuits employing switched capacitive elements in wireless power transfer receiver devices.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices include inductors, typically coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transfer system including a transmitter and a receiver. The transmitter includes a first inductive element and a current generator. The current generator is configured to supply a current to the first inductive element to generate an electromagnetic field for transferring wireless power. The receiver includes a second inductive element, a tuning circuit, and a controller. The second inductive element is configured to receive wireless power from the electromagnetic field. The tuning circuit has a reactance and includes a plurality of capacitive elements connected to the second inductive element. The plurality of capacitive elements are configured to supply an output current to a load. The controller is configured to selectively connect the plurality of capacitive elements in a plurality of configurations. The tuning circuit has substantially the same reactance in each of the plurality of configurations.

In another aspect, the disclosure provides a wireless power receiver including an inductive element, a tuning circuit, and a controller. The inductive element is configured to receive wireless power from an electromagnetic field associated with a wireless power transmitter. The tuning circuit has a reactance and includes a plurality of capacitive elements connected to the inductive element. The plurality of capacitive elements are configured to supply an output current to a load. The controller is configured to selectively connect the plurality of capacitive elements in a plurality of configurations. The tuning circuit has substantially the same reactance in each of the plurality of configurations.

In a further aspect, the disclosure provides a method for receiving wireless power including: receiving with an inductive element wireless power from an electromagnetic field associated with a wireless power transmitter; and selectively connecting a plurality of capacitive elements of a tuning circuit in one of a plurality of configurations, the tuning circuit having a reactance and comprising the plurality of capacitive elements connected to the inductive element, the tuning circuit having substantially the same reactance in each of the plurality of configurations, the plurality of capacitive elements configured to supply an output current to a load.

In another aspect, the disclosure provides a wireless power receiver including: means for receiving wireless power from an electromagnetic field associated with a wireless power transmitter; and means for selectively connecting a plurality of capacitive elements of a tuning circuit in one of a plurality of configurations, the tuning circuit having a reactance and comprising the plurality of capacitive elements connected to the means for receiving wireless power, the tuning circuit having substantially the same reactance in each of the plurality of configurations, the plurality of capacitive elements configured to supply an output current to a load.

In a further aspect, the disclosure provides a non-transitory, computer-readable medium comprising instructions that when executed cause a processor to perform a method of: receiving with an inductive element wireless power from an electromagnetic field associated with a wireless power transmitter; and selectively connecting a plurality of capacitive elements of a tuning circuit in one of a plurality of configurations, the tuning circuit having a reactance and comprising the plurality of capacitive elements connected to the inductive element, the tuning circuit having substantially the same reactance in each of the plurality of configurations, the plurality of capacitive elements configured to supply an output current to a load.

Figure 1:
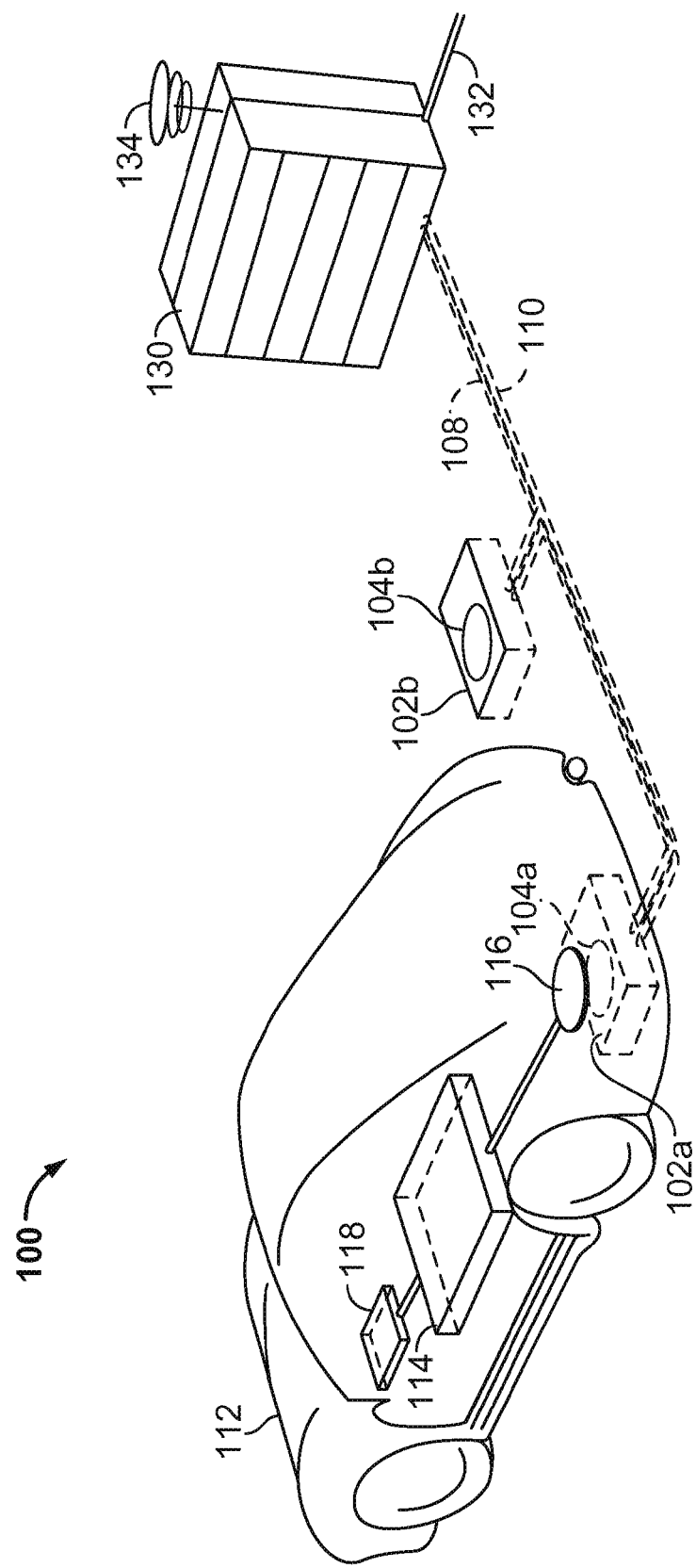
FIG. 1 is a diagram of an exemplary wireless power transfer system for charging a wireless power receiver, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. The exemplary embodiments of the invention may be practiced without these specific details. In some instances, well-known structures and devices are shown in block diagram form in order to avoid obscuring the novelty of the exemplary embodiments presented herein.

Inductive power transfer (IPT) systems may use resonant inductive coupling, in which power is transmitted between inductive coils tuned to resonate at a certain frequency. Resonant coupling may be achieved by adding inductive and/or capacitive elements in series or parallel with the induction coils.

In a resonant IPT system, the proportion of available power transferred to a secondary power receiver device is dependent on the degree of coupling between primary and secondary inductors. The greater the coupling, the more power is transferred to the secondary inductor. A coupling coefficient is defined as the fraction of flux of the primary inductor coil that passes through the secondary inductor coil and is a function of the geometry of the system. The coupling coefficient is therefore dependent on the distance between the primary and secondary coils and their alignment.

In wireless power transfer systems for charging devices using IPT, there can be large variations in the level of coupling each time a device is charged. The distance and alignment between the primary and secondary inductor coils may vary based on the location of the coils and the positioning of the device, on which the secondary inductor is mounted, with respect to a base power device. Such variations in the level of coupling result in difficulties with configuring a system to deliver optimal power to a device battery in the variety of situations likely to be encountered.

In some IPT systems for charging devices, switching is performed in the power supply in the base device to vary the current in the primary coil and thereby optimize efficiency based on the degree of coupling. In a poorly coupled system, the current in the primary inductor may be substantially higher than that in a closely coupled system while achieving the same current output from the secondary inductor.

Such variation in the current in the primary coil may, in some aspects, place significant stress on the power electronic components in the system, resulting in a system that may have relatively expensive componentry, a diminished reliability, and a limited operating range.

FIG. 1 is a diagram of an exemplary wireless power transfer system 100 for charging a wireless power receiver 112, such as an electric vehicle as illustrated, in accordance with an exemplary embodiment. The wireless power transfer system 100 enables charging of a wireless power receiver 112 while the wireless power receiver 112 is located near a base wireless power charging system 102*a*. In FIG. 1, spaces for two electric vehicles are illustrated in a parking area to be parked over corresponding base wireless power charging system 102*a* and 102*b*. In some embodiments, a local distribution center 130 may be connected to a power backbone 132 and configured to provide an alternating current (AC) or a direct current (DC) supply through a power link 110 to the base wireless power charging system 102*a*. The base wireless power charging system 102*a* also includes a base system induction coil 104*a* for wirelessly transferring or receiving power. An wireless power receiver 112 may include a battery unit 118, a wireless power receiver induction coil 116, and a wireless power receiver charging system 114. The wireless power receiver induction coil 116 may interact with the base system induction coil 104*a*, for example, via a region of the electromagnetic field generated by the base system induction coil 104*a*.

In some exemplary embodiments, the wireless power receiver induction coil 116 may receive power when the wireless power receiver induction coil 116 is located in an energy field produced by the base system induction coil 104*a*. The field corresponds to a region where energy output by the base system induction coil 104*a* may be captured by a wireless power receiver induction coil 116. In some cases, the field may correspond to the "near field" of the base system induction coil 104*a*. The near-field may correspond to a region in which there are strong reactive fields resulting from the currents and charges in the base system induction coil 104*a* that do not radiate power away from the base system induction coil 104*a*. In some cases, the near-field may correspond to a region that is within about ½π of wavelength of the base system induction coil 104*a* (and vice versa for the wireless power receiver induction coil 116).

Local distribution 130 may be configured to communicate with external sources (e.g., a power grid) via a communication backhaul 134, and with the base wireless power charging system 102*a* via a communication link 108.

In some embodiments, the wireless power receiver induction coil 116 may be aligned with the base system induction coil 104*a* and, therefore, disposed within a near-field region simply by positioning the wireless power receiver 112 correctly relative to the base system induction coil 104*a*. Additionally or alternatively, a user or driver may be given visual feedback, auditory feedback, or combinations thereof to determine when the wireless power receiver 112 is properly placed for wireless power transfer. Additionally or alternatively, the wireless power receiver 112 may be positioned by an autopilot system, which may move the wireless power receiver 112 back and forth (e.g., in zig-zag movements) until an alignment error has reached a tolerable value. This may be performed automatically and autonomously by the wireless power receiver 112 without user or driver intervention or with minimal user or driver intervention if, for instance, the wireless power receiver 112 is equipped with a servo steering wheel, ultrasonic sensors, and intelligence. Additionally or alternatively, the wireless power receiver induction coil 116, the base system induction coil 104*a*, or a combination thereof may have functionality for displacing and moving the induction coils 116 and 104*a* relative to each other to more accurately orient them and develop more efficient coupling therebetween.

The base wireless power charging system 102*a* may be located in a variety of locations. As examples, some suitable locations include a parking area at a home of an electric vehicle owner, parking areas reserved for electric vehicle wireless charging modeled after conventional petroleum-based filling stations, and parking lots at other locations such as shopping centers and places of employment. As additional examples, suitable locations include countertops or walls of homes or businesses and surfaces of large appliances such as refrigerators or washing machines.

In some aspects, charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and devices visible or accessible, thereby reducing potential vandalism of power charging devices. Further, since an electric vehicle may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetic and non-impedimental advantages. For example, in the case of electric vehicles, there may be no charge columns and cables that may be impedimental for vehicles and/or pedestrians.

Although the wireless power receiver 112 is labeled as a receiver, in some aspects, the wireless power transmit and receive capabilities of the wireless power transfer system 100 may be configured to be reciprocal such that the base wireless power charging system 102*a* transfers power to the wireless power receiver 112 and the wireless power receiver 112 transfers power to the base wireless power charging system 102*a*. For example, the wireless power receiver 112 may transfer power to the base wireless power charging system 102*a* in times of energy shortfall. This capability may be useful to stabilize the power distribution grid by allowing wireless power receivers to contribute power to the overall distribution system in times of energy shortfall caused by over demand or shortfall in renewable energy production (e.g., wind or solar).

Figure 2:
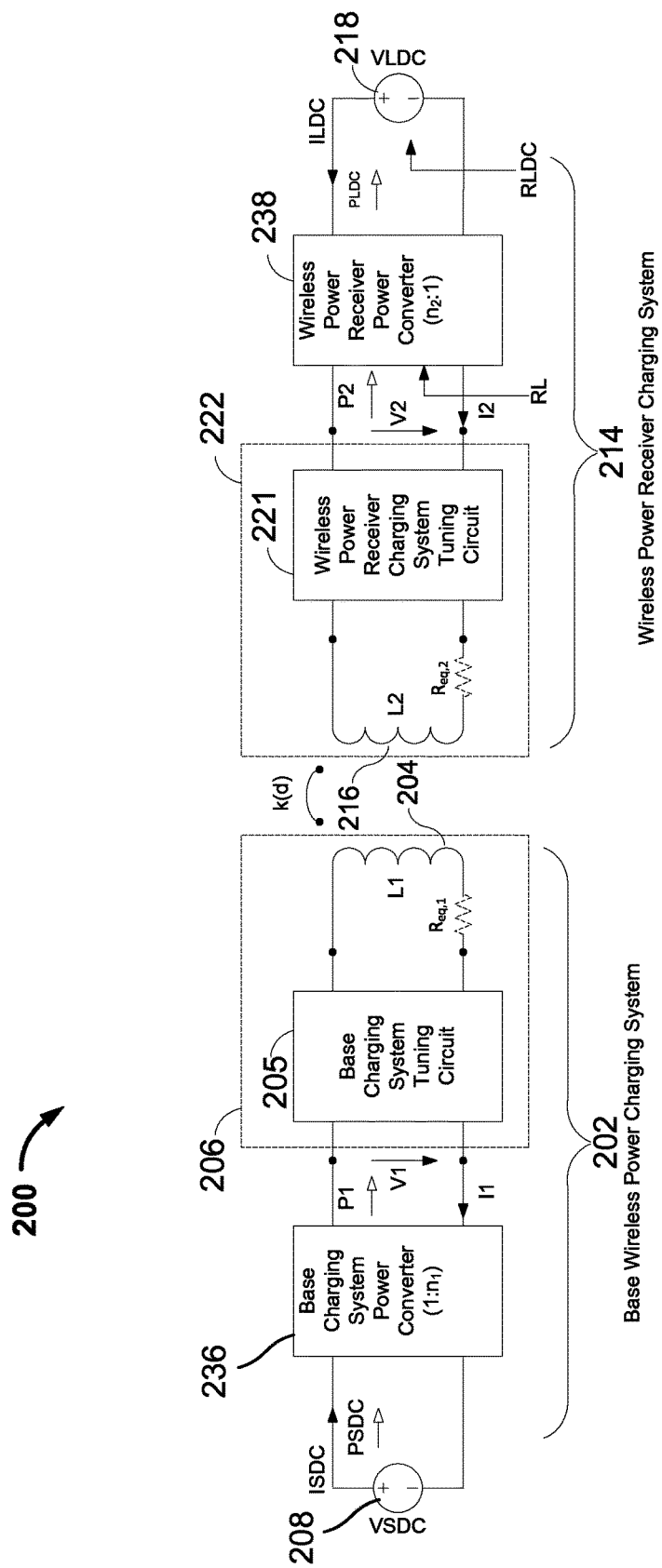
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes a wireless power receive circuit 222 including a wireless power receiver induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204). As shown in FIG. 2, inductance may generally be the inductance of the induction coil, whereas, capacitance may be added to the induction coil to create a resonant structure at a desired resonant frequency. As an example, a capacitor may be added in series with or parallel to the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another example, a capacitor may be placed in parallel between the two terminals of the induction coil (e.g., a parallel resonant circuit). Furthermore, an induction coil may be designed to have a high quality (Q) factor to improve the resonance of the induction coil.

The coils may be used for the wireless power receiver induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to a wireless power receiver charging system 214 of a wireless power receiver 112, but is not limited thereto. For example, the wireless power receiver 112 may transfer power to the base wireless power charging system 202.

With reference to FIG. 2, a power supply 208 (e.g., AC or DC) supplies power $P_{SDC}$ to the base wireless power charging system 202 to transfer energy to a wireless power receiver 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ may be provided to form a resonant circuit with the base system induction coil 204 that resonates at a desired frequency.

Both the base system transmit circuit 206 including the base system induction coil 204 and wireless power receive circuit 222 including the wireless power receiver induction coil 216 may be tuned to substantially the same frequencies and may be positioned within the near-field of an electromagnetic field transmitted by one of the base system induction coil 204 and the wireless power receiver induction coil 216. In this case, the base system induction coil 204 and wireless power receiver induction coil 216 may become coupled to one another such that power may be transferred to the wireless power receive circuit 222 including a wireless power receiver charging system tuning circuit 221 and wireless power receiver induction coil 216. The wireless power receiver charging system tuning circuit 221 may be provided to form a resonant circuit with the wireless power receiver induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and wireless power receiver charging system tuning circuit 221, respectively. The wireless power receive circuit 222 including the wireless power receiver induction coil 216 and wireless power receiver charging system tuning circuit 221 receives power $P_2$ and provides the power $P_2$ to a wireless power receiver power converter 238 of a wireless power receiver charging system 214.

The wireless power receiver power converter 238 may include, for example, a LF/DC converter configured to convert power at an operating frequency back to DC power at a voltage level matched to the voltage level of a wireless power receiver battery unit 218. The wireless power receiver power converter 238 may provide the converted power $P_{LDC}$ to charge the wireless power receiver battery unit 218. The power supply 208, base charging system power converter 236, and base system induction coil 204 may be stationary and located at a variety of locations as discussed in this disclosure. The battery unit 218, wireless power receiver power converter 238, and wireless power receiver induction coil 216 may be included in a wireless power receiver charging system 214 that is part of wireless power receiver 112 or part of the battery pack (not shown). The wireless power receiver charging system 214 may also be configured to provide power wirelessly through the wireless power receiver induction coil 216 to the base wireless power charging system 202 to feed power back to the grid. Each of the wireless power receiver induction coil 216 and the base system induction coil 204 may act as transmit or receive induction coils based on the mode of operation.

While not shown, the wireless power transfer system 200 may include a load disconnect unit (LDU) to safely disconnect the wireless power receiver battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the wireless power receiver charging system 214 may include switching circuitry (not shown) for selectively connecting and disconnecting the wireless power receiver induction coil 216 to the wireless power receiver power converter 238. Disconnecting the wireless power receiver induction coil 216 may suspend charging and also may adjust the "load" as "seen" by the base wireless power charging system 202 (acting as a transmitter), which may be used to decouple the wireless power receiver charging system 214 (acting as the receiver) from the base wireless power charging system 202. The load changes may be detected if the transmitter includes the load sensing circuit. Accordingly, the transmitter, such as a base wireless power charging system 202, may have a mechanism for determining when receivers, such as a wireless power receiver charging system 214, are present in the near-field of the base system induction coil 204.

In operation, assuming energy transfer towards the wireless power receiver or battery, input power is provided from the power supply 208 such that the base system induction coil 204 generates a field for providing the energy transfer. The wireless power receiver induction coil 216 couples to the radiated field and generates output power for storage or consumption by the wireless power receiver charging system 214 or the wireless power receiver battery unit 218 of the wireless power receiver 112. As described above, in some embodiments, the base system induction coil 204 and wireless power receiver induction coil 216 are configured according to a mutual resonant relationship such that when the resonant frequency of the wireless power receiver induction coil 216 and the resonant frequency of the base system induction coil 204 are very close or substantially the same. Transmission losses between the base wireless power charging system 202 and wireless power receiver charging system 214 are minimal when the wireless power receiver induction coil 216 is located in the near-field of the base system induction coil 204.

An efficient energy transfer may occur by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur may be referred to herein as a near field coupling mode region.

While not shown, the base charging system power converter 236 and the wireless power receiver power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge one or more batteries.

The wireless power receiver induction coil 216 and base system induction coil 204 may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

Efficient transfer of energy between a transmitter and receiver may occur during matched or nearly matched resonance between a transmitter and a receiver. Further, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, coupling power between two induction coils that are in the near field of one another is disclosed. The near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
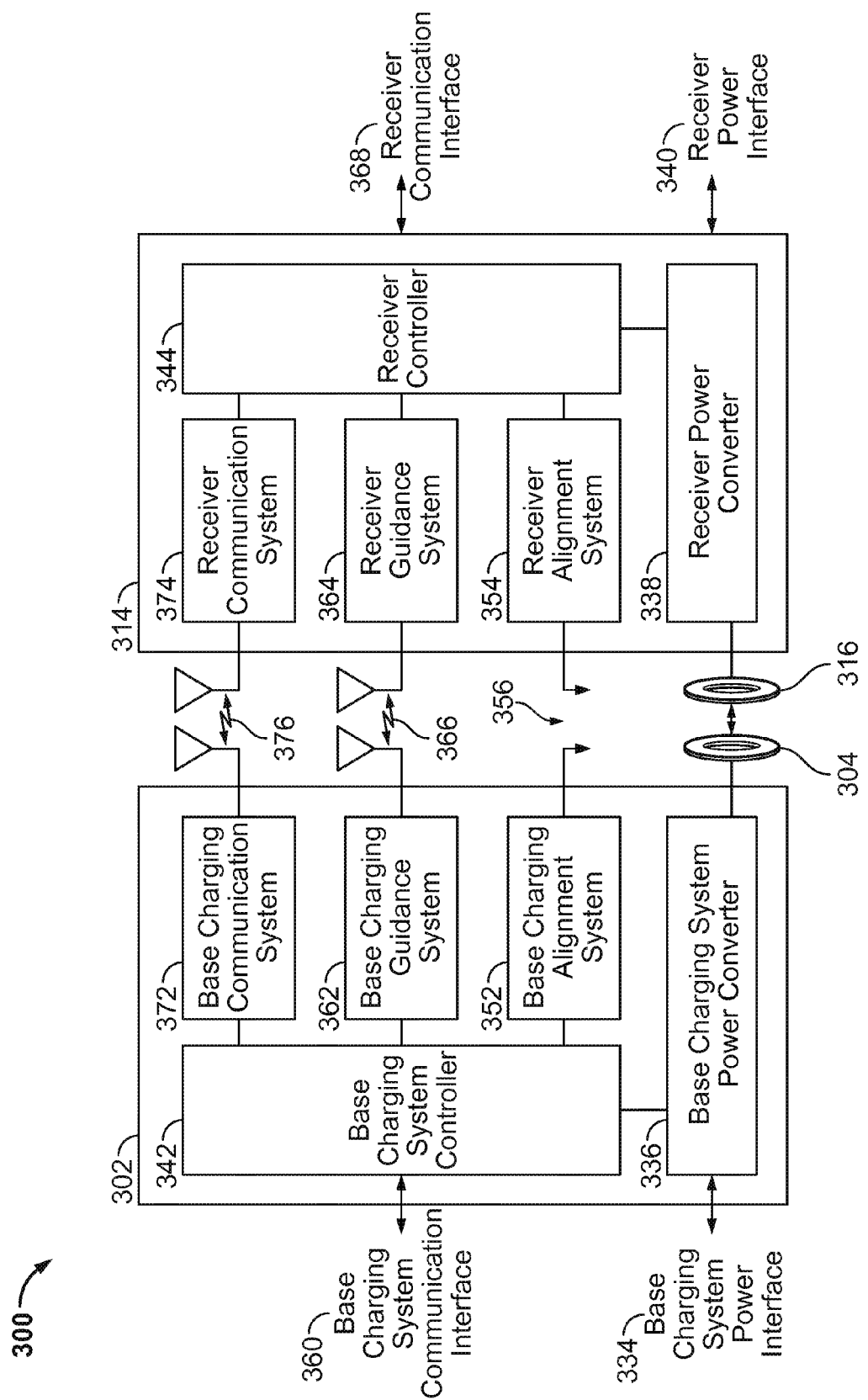
FIG. 3 is a functional block diagram showing exemplary core and ancillary components of the wireless power transfer system of FIG. 1.

FIG. 3 is a functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and wireless power receiver induction coil 316. As described above with reference to FIG. 2, and assuming energy flow towards a wireless power receiver, in FIG. 3 a base charging system power interface 334 may be configured to provide power to a charging system power converter 336 from a power source, such as an AC or DC power supply. The base charging system power converter 336 may receive AC or DC power from the base charging system power interface 334 to excite the base system induction coil 304 at or near its resonant frequency. The wireless power receiver induction coil 316, when in the near field coupling-mode region, may receive energy from the near field coupling mode region to oscillate at or near the resonant frequency. The wireless power receiver power converter 338 converts the oscillating signal from the wireless power receiver induction coil 316 to a power signal suitable for charging a battery via the wireless power receiver power interface 340.

The base wireless power charging system 302 includes a base charging system controller 342 and the wireless power receiver charging system 314 includes a wireless power receiver controller 344. The base charging system controller 342 may include a base charging system communication interface 360 to other systems such as, for example, a computer, and a power distribution center, or a smart power grid. The wireless power receiver controller 344 may include a wireless power receiver communication interface 368 to other systems such as, for example, an on-board computer on in an electric vehicle, one or more other battery charging controllers, other electronic systems within electric vehicles, and remote electronic systems.

The base charging system controller 342 and wireless power receiver controller 344 may include subsystems or modules for specific application with separate communication channels. These communications channels may be separate physical channels or separate logical channels. As examples, a base charging alignment system 352 may communicate with a wireless power receiver alignment system 354 through a communication link 376 to provide a feedback mechanism for more closely aligning the base system induction coil 304 and wireless power receiver induction coil 316, autonomously and/or with operator assistance. Similarly, a base charging guidance system 362 may communicate with a wireless power receiver guidance system 364 through a guidance link 366 to provide a feedback mechanism to guide an operator in aligning the base system induction coil 304 and wireless power receiver induction coil 316. Further, there may be separate general-purpose communication links (e.g., channels) supported by base charging communication system 372 and wireless power receiver communication system 374 for communicating other information between the base wireless power charging system 302 and the wireless power receiver charging system 314. This information may include information about wireless power receiver characteristics, battery characteristics, charging status, and power capabilities of both the base wireless power charging system 302 and the wireless power receiver charging system 314, as well as maintenance and diagnostic data for a wireless power receiver. These communication channels may be separate physical communication channels such as, for example, Bluetooth, zigbee, cellular, and the like.

To communicate between a base wireless power charging system 302 and a wireless power receiver charging system 314, the wireless power transfer system 300 may use both in-band signaling and an RF data modem (e.g., Ethernet over radio in an unlicensed band). The out-of-band communication may provide sufficient bandwidth for the allocation of value-add services to the wireless power receiver user/ owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active wireless power receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 304. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion using solid state devices. Further, there may be less coexistence issues at this frequency band compared to other bands.

Figure 4:
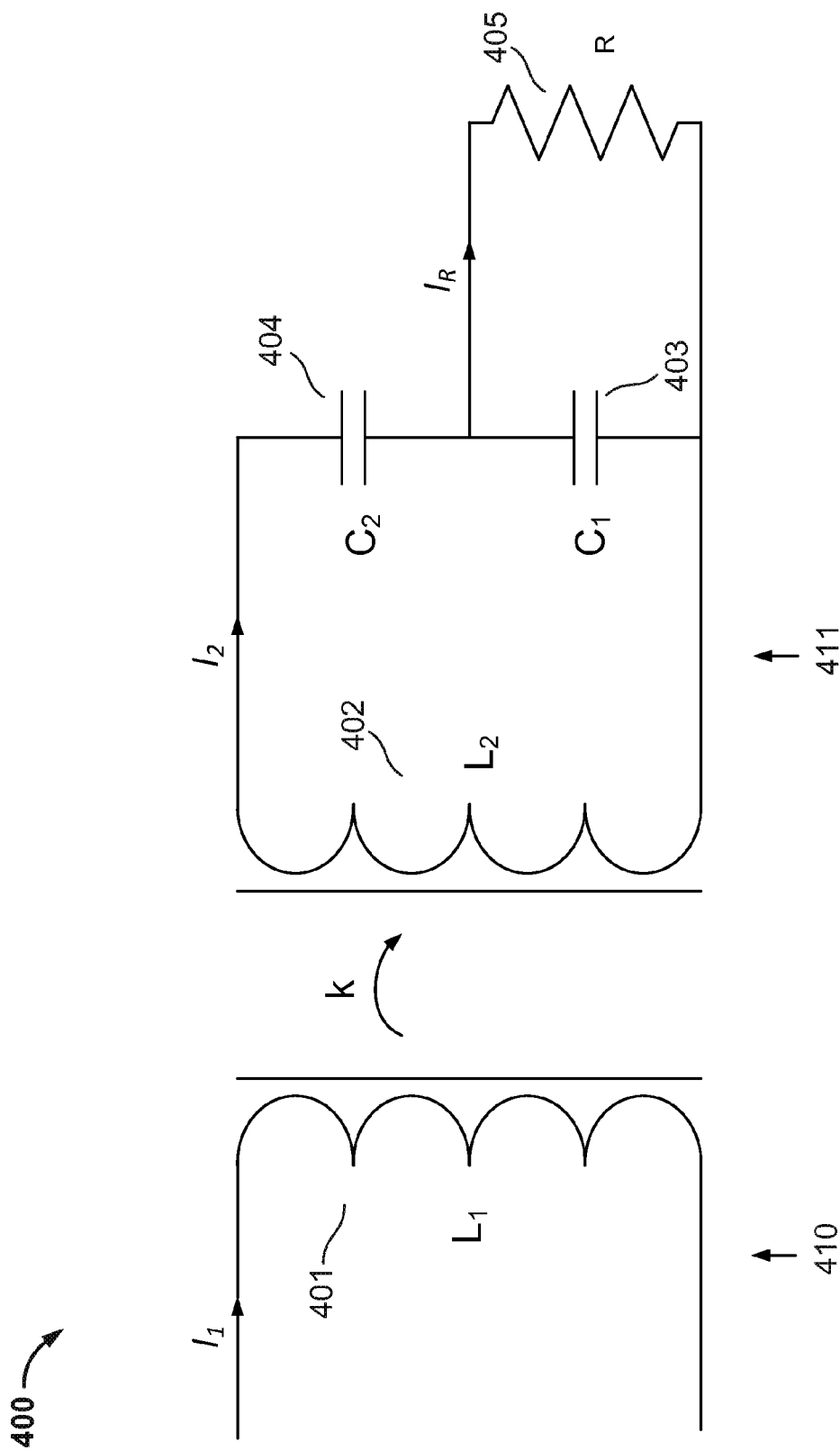
FIG. 4 is a schematic diagram of exemplary components of part of a wireless power transfer system according to an exemplary embodiment.

FIG. 4 is a schematic diagram of exemplary components of part of a wireless power transfer system, such as the wireless power transfer system 200 shown in FIG. 2, according to an exemplary embodiment. A base system transmit circuit 410 includes an inductive element 401 having an inductance $L_1$ through which a base or track current $I_1$ passes. The base system inductive element 401 is able to be inductively coupled to an inductive element 402 having an inductance $L_2$ in a wireless power receive circuit 411. The level of coupling between the wireless power transmitter and receiver devices is represented by coupling coefficient k. When an alternating current is passed through inductor 401, a voltage is induced in the wireless power receive circuit 411, resulting in a current $I_2$ passing through inductor 402.

The wireless power receive circuit 411 includes a tuning circuit in which capacitive elements 403 and 404 having capacitances of $C_1$ and $C_2$, respectively. The capacitive elements 403 and 404 are further connected in parallel and in series, respectively, with inductor 402. The capacitive elements 403 and 404 may include one or more capacitors. An output current $I_R$ may be drawn from across capacitor 403 to supply a load 405, which is representative of the components in a wireless power receiver charging system downstream of the wireless power receive circuit 411, including a wireless power receiver battery unit (now shown). The load 405 is generally depicted in the embodiment shown in FIG. 4 by a resistive load having resistance R. In other embodiments, the load may have an impedance including a reactive part, as well as a resistive part. For simplicity, a purely resistive load is represented in FIG. 4 and may be represented throughout this disclosure.

Figure 5:
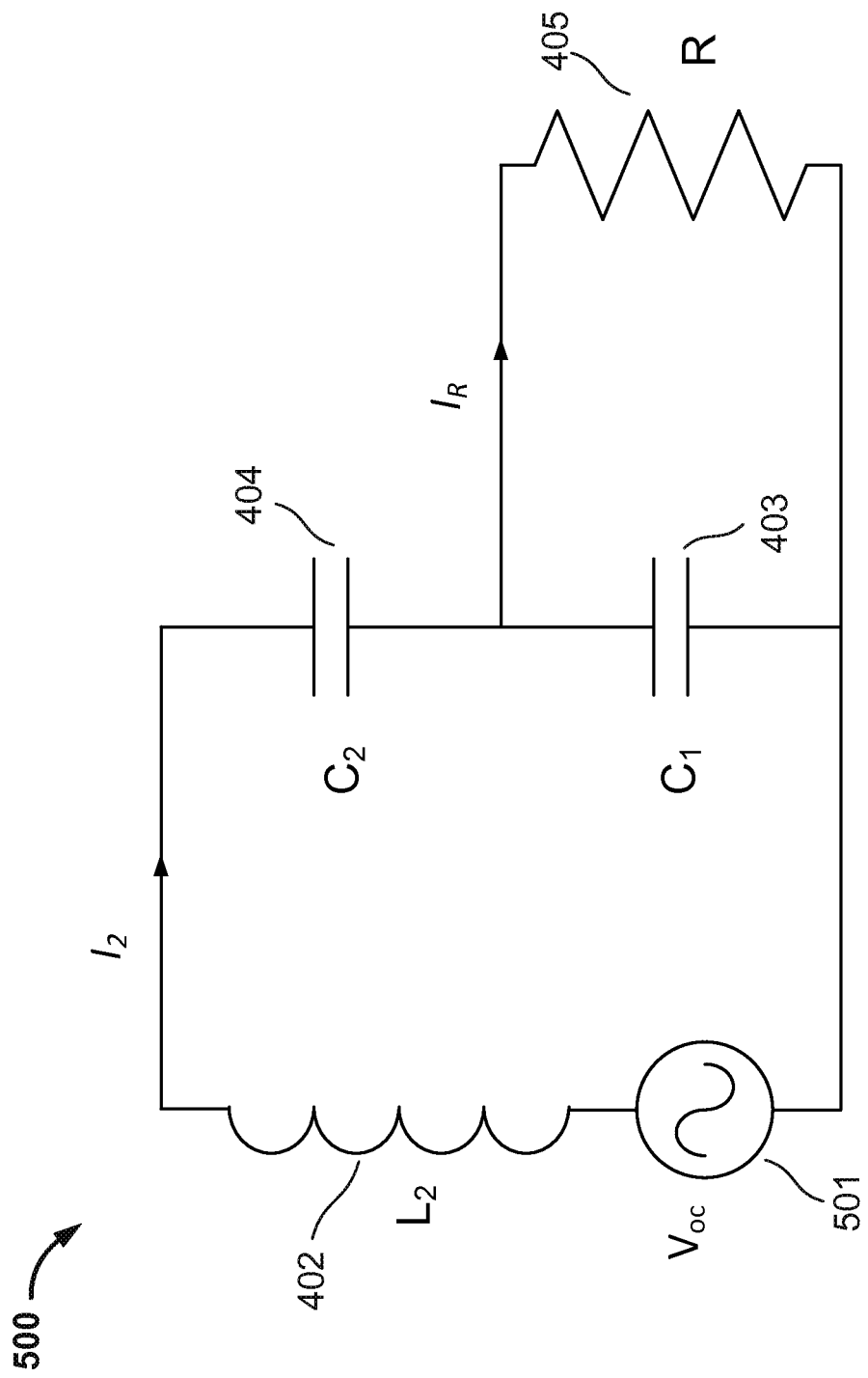
FIG. 5 is a schematic diagram of a circuit equivalent to the wireless power receive circuit shown in FIG. 4.

FIG. 5 is a schematic diagram of a circuit 500 equivalent to the wireless power receive circuit 411 shown in FIG. 4. Through inductive coupling between the wireless power transmitter 410 and receiver circuits 411, a voltage $V_{oc}$ is induced into inductive element 402. This voltage is represented by voltage source 501 in FIG. 5.

When an alternating current $I_1$ having a frequency w is present in the base circuit 410, the induced voltage in the wireless power receive circuit 500 is given by Equation 1.

$$V_{oc} = j\omega I_1 k\sqrt{L_1 L_2} \quad \text{Equation 1}$$

The values of $C_1$ and $C_2$ may be chosen so that, with inductive element 402, a tuned resonant circuit is formed at the frequency of the alternating base circuit current $I_1$. To achieve tuning in the circuit shown in FIG. 5, the values of $C_1$, $C_2$, and $L_2$ may be related according to Equation 2.

$$\omega L_2 = \left(\frac{C_1 + C_2}{\omega C_1 C_2}\right) \quad \text{Equation 2}$$

The output current $I_R$ supplied to the load 405 may be given by Equation 3.

$$I_R = V_{oc} \omega C_1 \quad \text{Equation 3}$$

It should be noted that the formulae used herein assume perfect tuning and ideal components as presented in the figures. In reality, there may be losses or minor residual effects that cause the true values to differ from the ideal case. However, the formulae provide values that approximate the real values and usefully illustrate relationships between variables.

In a wireless power receiver charging situation, the level of coupling between the transmitter and receiver circuits may determine the output current $I_R$ for a given base current $I_1$. The level of coupling is indicated by the coupling coefficient k, which may be determined at least in part by geometric factors such as the alignment of the inductors in the transmitter and receiver circuits and the distance between the inductors. These factors may vary between charging events, for example, depending on the positioning of the wireless power receiver. Therefore, the coupling coefficient k may also vary between charging events.

It may be desirable to attain a particular output current $I_R$ to supply load 405 for a given wireless power receiver charging system. The particular output current may suit the charging characteristics of a particular wireless power receiver battery unit and may increase the efficiency of the system. The particular output current may be a certain range of current values within a given level of tolerance from an optimal output current.

One manner in which a particular output current can be achieved is by varying the base current $I_1$ passing through primary inductive element 401 as shown in FIG. 4. However, the difference in the level of coupling between a closely coupled scenario (corresponding to a scenario having a high coupling coefficient k) and a poorly coupled scenario (corresponding to a scenario having a low coupling coefficient k) may be significant. This may mean a large variation in base current $I_1$ would be used to achieve the particular output current in the tuning circuit 500 in various coupling scenarios. Further, a maximum achievable base current may limit the range of alignment scenarios that the system can tolerate. Variation in the current in the primary coil, in some aspects, may place significant stress on the power electronic components in the system, resulting in the use of expensive componentry, diminished reliability, and limited operating range, and may therefore be undesirable in some cases.

In the circuits shown in FIGS. 4 and 5, the values of capacitances $C_1$ and $C_2$ may be varied in order to vary the output current for a given base current and a given level of coupling. However, varying $C_1$ and $C_2$ may further affect the tuning of the circuit, which may reduce the efficiency of power transfer at the resonant frequency. It may therefore be desirable to vary the partial series or parallel capacitance while keeping the circuit tuned.

Exemplary embodiments of the present disclosure include a controller configured to selectively connect capacitive elements in the wireless power receiver circuit of a wireless power receiver to enable the output current to be varied for a given level of coupling, thus enabling the circuit to be selectively deliver the particular output current, while the resonant frequency at which inductive element 401 is tuned remains substantially the same for different configurations of the capacitive elements.

Figure 6:
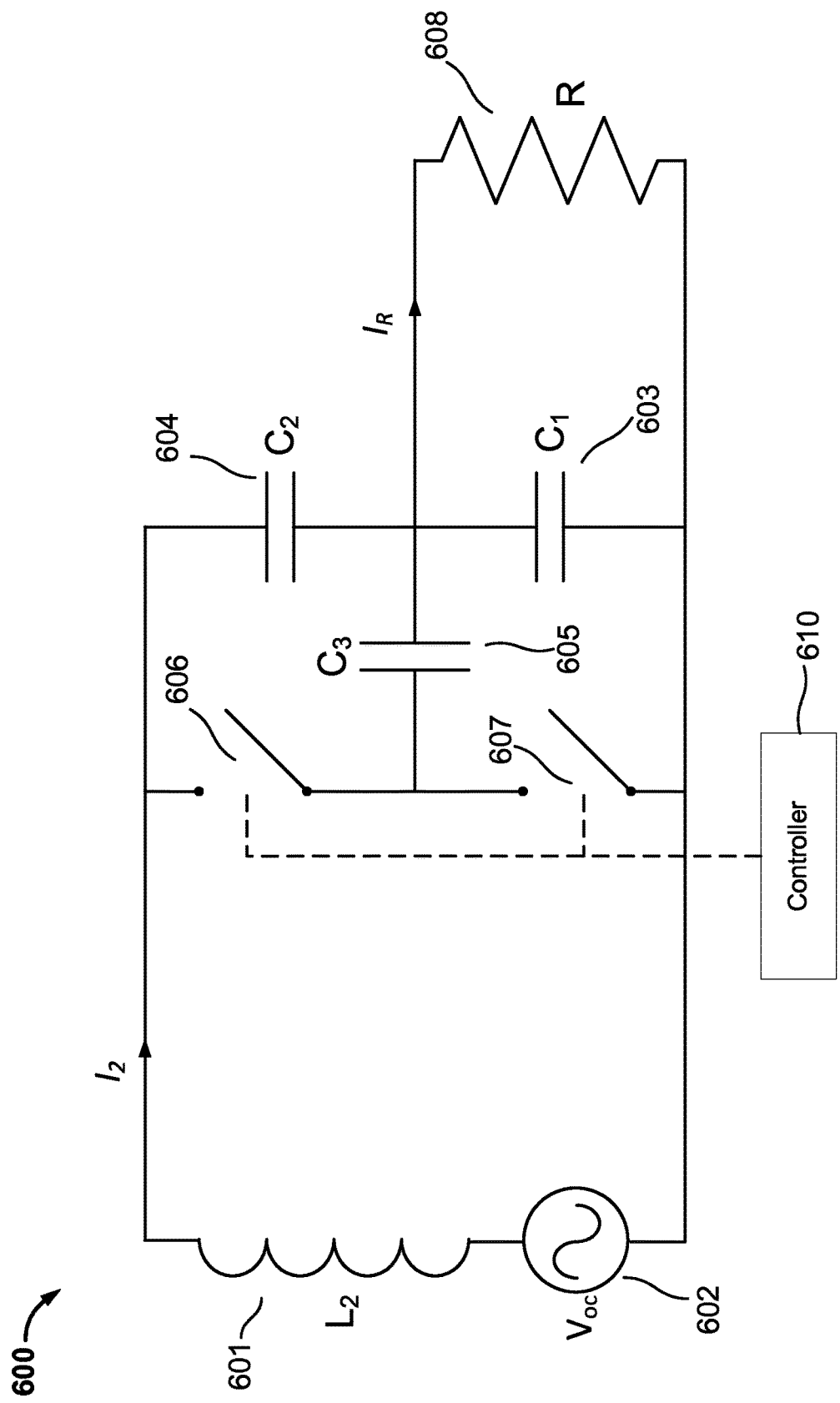
FIG. 6 is a schematic diagram of a wireless power receiver charging system circuit according to an exemplary embodiment.

FIG. 6 is a schematic diagram of a wireless power receiver charging system circuit 600 according to an exemplary embodiment. The circuit 600 includes an inductive element 601 having inductance $L_2$ in which a voltage $V_{oc}$ is induced by means of resonant inductive coupling from an inductive element of a wireless power transfer transmitter circuit (not shown). The induced voltage is shown as an equivalent voltage source 602. The circuit 600 further comprises capacitive elements in the form of capacitors 603, 604, and 605 having capacitances $C_1$, $C_2$, and $C_3$, respectively. The circuit 600 also includes switching elements 606 and 607. An output current $I_R$ is drawn from across capacitor 603 to supply a load 608, which is representative of other parts of a wireless power receiver charging system, including a battery unit, and is depicted as being a resistive load of resistance R. In other embodiments, current $I_R$ may be supplied to directly power a load, or may be used to charge a battery unit and power a load.

Capacitors 603, 604, and 605 and switching elements 606 and 607 are connected such that switching elements 606 and 607 are connected in series and capacitors 603 and 604 (having capacitances $C_1$ and $C_2$, respectively) are connected in series, with the two switching elements 606, 607 being connected in parallel with the two capacitors 603, 604. Capacitor 605 (having capacitance $C_3$) is connected to bridge from between the two switching elements to between capacitors 603 and 604.

Switches 606 and 607 can be opened and closed to configure the connection of capacitors 603, 604, and 605 and the reactance presented to the inductor 601 and thereby vary the output current $I_R$. In a configuration in which switch 606 is closed and switch 607 is open, capacitors 604 and 605 are connected in parallel with each other and in series with capacitor 603. In this configuration, the output current may be given by Equation 4.

$$I_R = V_{oc}\omega C_1 \qquad \text{Equation 4}$$

In another configuration, switch 606 may be open and switch 607 may be closed. In this case, capacitors 603 and 605 are connected in parallel with each other and in series with capacitor 604. In this configuration, the output current may be given by Equation 5.

$$I_R = V_{oc}\omega(C_1+C_3) \qquad \text{Equation 5}$$

In the former configuration, the series reactance of the tuning circuit is lower, and the output current is lower. In the latter configuration, the series reactance is higher, and the output current is higher.

To maintain the tuning of the wireless power receive circuit in both configurations discussed above, the reactance of both circuits may be substantially equal. The reactance of the circuit in which switch 606 is closed and switch 607 is open may be given by Equation 6.

$$X_{high\,k} = \left(\frac{C_1 + C_2 + C_3}{\omega(C_2+C_3)C_1}\right) \qquad \text{Equation 6}$$

The reactance of the circuit in which switch 606 is open and switch 607 is closed may be given by Equation 7.

$$X_{low\,k} = \left(\frac{C_1 + C_2 + C_3}{\omega(C_1+C_3)C_2}\right) \qquad \text{Equation 7}$$

For these values of reactance to be equal, the relationship between $C_1$ and $C_2$ may be given by Equation 8.

$$C_1 = C_2 \qquad \text{Equation 8}$$

In some embodiments, the capacitances of capacitors 603 and 604 may be substantially equal in order to be able to switch the wireless power receiver charging system circuit 600 between high and low current modes while maintaining the same reactance of the tuning circuit in both configurations. As a result, the circuit may advantageously remain tuned and energy transfer may be improved.

In the circuit illustrated in FIG. 6, the normalized difference between the output current in the high and low current modes may be given by Equation 9.

$$\Delta I = \left(1 + \frac{C_3}{C_1}\right). \qquad \text{Equation 9}$$

In another embodiment, the difference between the output current in the high and low current modes may be given by Equation 10.

$$\Delta I = V_{oc}\left(1 + \frac{C_3}{C_1}\right) \qquad \text{Equation 10}$$

Therefore, the ratio of the capacitances of capacitors 605 and 603 may give the percentage increase in output current achievable in the wireless power receiver charging system circuit 600.

Figure 7:
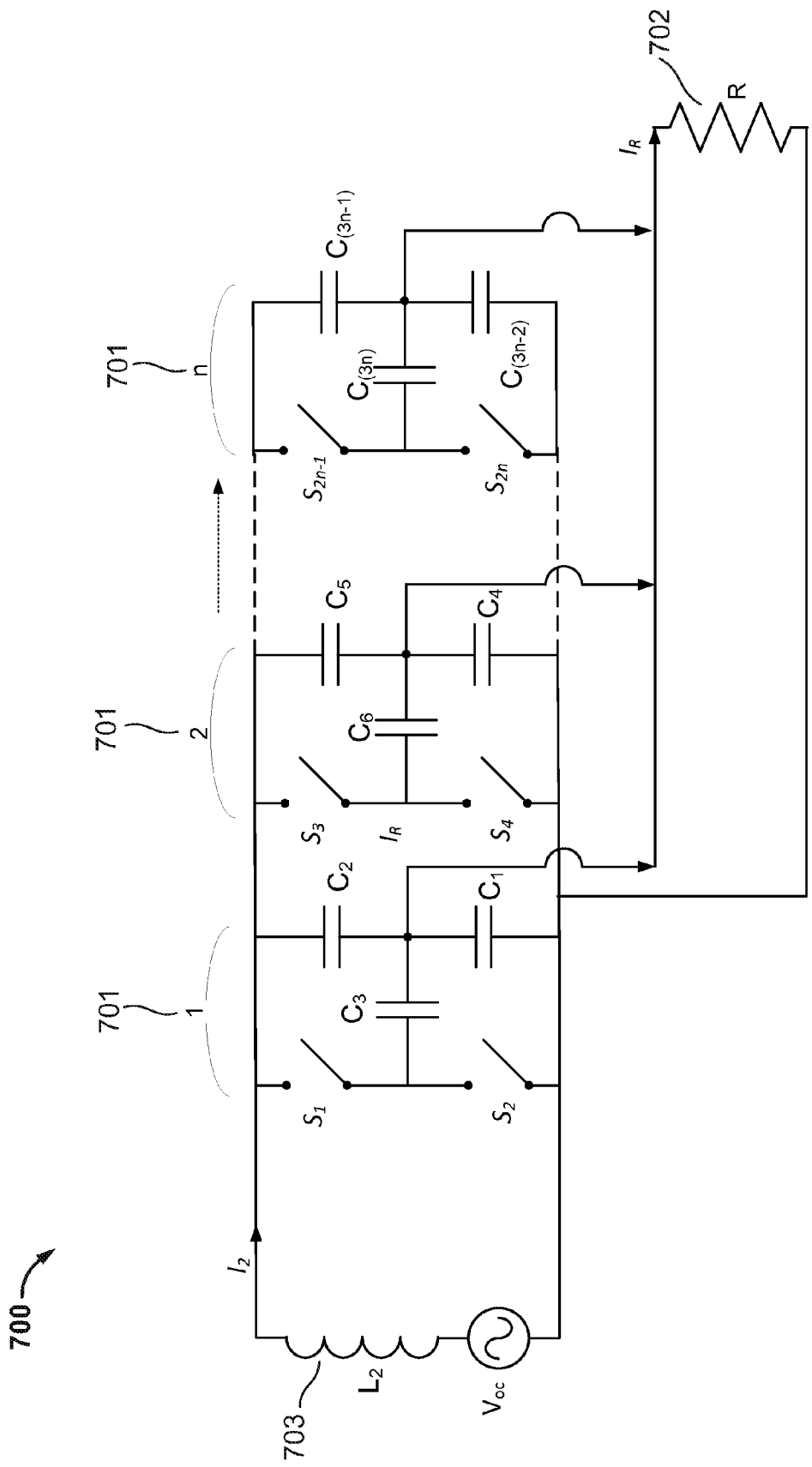
FIG. 7 is a schematic diagram of a wireless power receiver charging system circuit according to an exemplary embodiment.

In some embodiments, a sub-circuit consisting of two switching elements 606 and 607, and capacitors 603, 604 and 605 may be repeated, with further sub-circuits connected in parallel. FIG. 7 is a schematic diagram of such a wireless power receiver charging system circuit 700 according to an exemplary embodiment. In circuit 700, the sub-circuit 701 of switching elements and capacitors shown in FIG. 6 has been repeated n times, each connected in parallel to the other. As a result, the circuit 700 includes 2×n switching elements and 3×n capacitors. The capacitances of the capacitors may vary between sub-circuits. The output current $I_R$ drawn by the load 702 is the sum of the output currents of each of the sub-circuits.

To maintain the tuning of the wireless power receiver charging system circuit 700 in one or more configurations of the 2×n switching elements, the capacitors connected in series in sub-circuits may have equal capacitances such that $C_1=C_2$, $C_4=C_5$, $C_{(3n-2)}=C_{(3n-1)}$, etc.

The number of different output currents that can be achieved by circuit 700 through different combinations of open and closed switches for a given induced voltage $V_{oc}$ may be given by $2^n$. Therefore, the circuit can be configured to provide many different levels of output current $I_R$ for a given induced voltage. In addition, the values of the capacitances in each of the sub-circuits 701 can be selected to tailor spacings between each level of output current. For example, the capacitances can be selected to linearly space achievable output current levels, or more closely space the achievable output current levels where desirable. As another example, if efficiency is lost for small changes at certain levels, more capacitance configurations can be made to achieve output currents around that level. By using this level of configuration, a wireless power transfer system can select the configuration of capacitors that provides the output current giving an optimal efficiency for the parameters of the wireless power transfer system and circumstances of charging events, such as the alignment or distance between inductors which affects the coupling coefficient.

In some embodiments, the wireless power receiver charging system includes means for measuring one or more parameters of the system and means for selecting the configuration of capacitive elements that will achieve an output current.

For example, the wireless power receiver charging system circuits 600 and 700 may include means for measuring the short circuit current across the receiver or secondary inductive element 601 or 703. This can be measured by selectively closing both the switches in the sub-circuit nearest the inductive element, for example, closing switches 606 and 607 in circuit 600, shorting the circuit. For a given base current in the primary inductor, the short circuit current across the secondary inductor may be indicative of the level of coupling between the inductors and can be used to determine which configuration of capacitors may achieve an output current. Any appropriate means of measuring the short circuit current may be used.

Opening and closing of the switching elements in the wireless power receiver charging system circuits may be controlled by a controller, such as controller 610 illustrated in FIG. 6. The switching controller may be included in a wireless power receiver controller that controls other aspects of the wireless power receiver charging system, such as the wireless power receiver controller 344 illustrated in FIG. 3. The controller may close the switches to enable the short circuit current to be measured and subsequently switch the switches to the configuration selected to best provide a required output current. In some embodiments, the switches are relays or other electrically operated switches. The controller may use the exemplary logic described below to decide the appropriate switch configuration in different circumstances. The controller may comprise appropriate storage and processor means for determining a configuration of switching elements given measured system parameters.

In addition to the flexibility provided by the switchable configuration of capacitors for tailoring the output current for a given induced voltage, further flexibility can be provided by varying the base current in the primary inductor (for example, inductor 401 of FIG. 4). Varying the base current in the primary inductor may enable the output current to be varied for a given level of coupling. By adjusting both the base current and the configuration of capacitors, a greater degree of optimization may be achievable than adjusting each alone in some aspects.

Consequently, some embodiments of the invention include means for measuring or adjusting the current through the inductive element in the base or primary coil, in addition to the means for selecting a configuration of capacitive elements in the wireless power receiver circuit. In some embodiments, the current in the inductive element in the base coil may be measured and/or adjusted by a controller in the base charging system, for example, the base charging system controller 342 illustrated in FIG. 3. Further, communication of the base charging system controller 342 with the wireless power receiver controller 344, for example, through communication link 376 may enable one or both controllers to adjust the base coil current and capacitive element configuration to achieve an output current and optimize the efficiency of the system.

Figure 8:
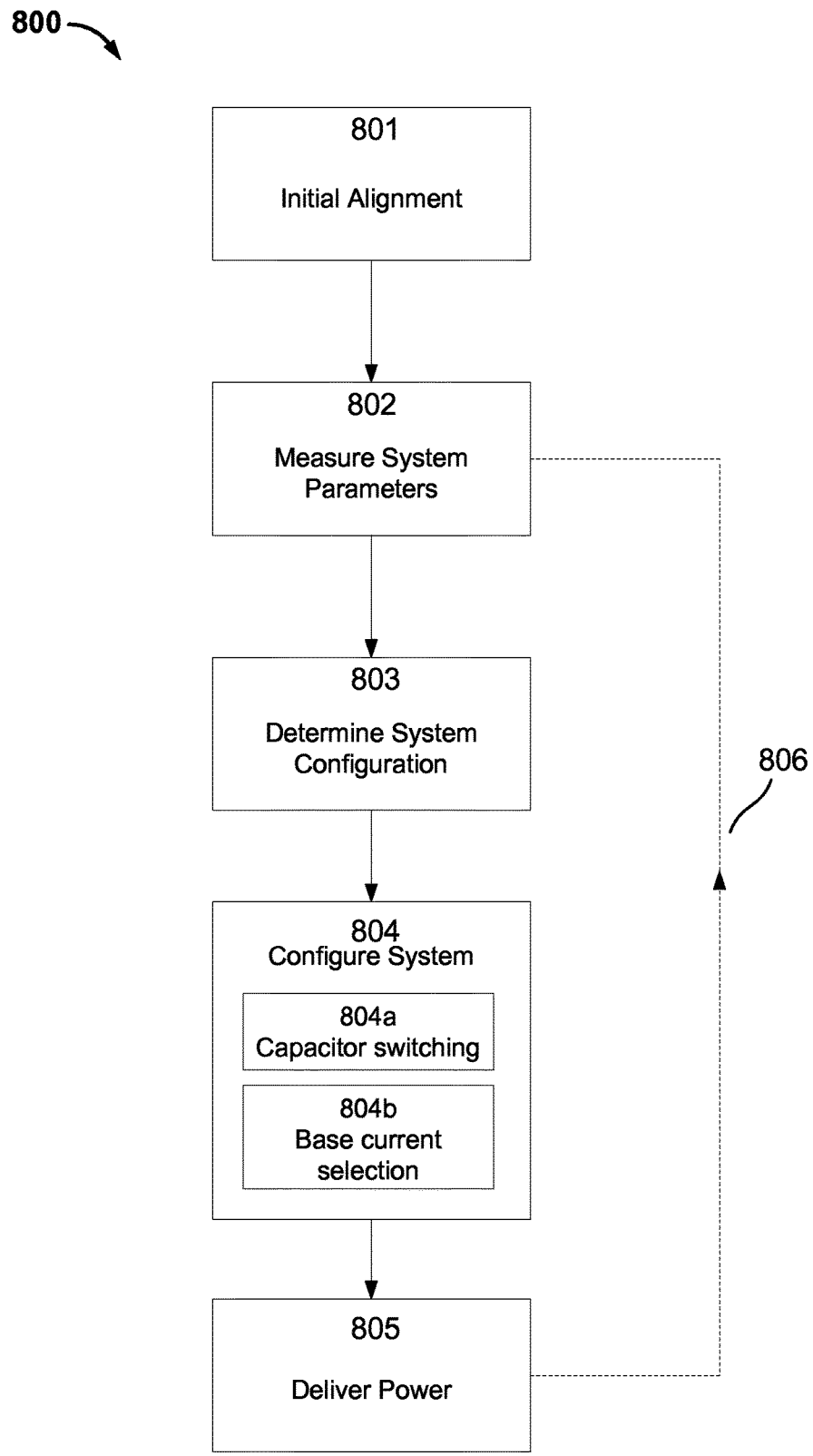
FIG. 8 is a flow diagram illustrating a method of configuring and operating a wireless power transfer system according to an exemplary embodiment.

FIG. 8 is a flow diagram illustrating a method 800 of configuring and operating a wireless power transfer system according to an exemplary embodiment. The method 800 may be performed, for instance, each time a wireless power receiver is charged to enable the system to be optimized for that particular charging event.

At block 801, initial alignment of the wireless power receiver may occur, for example, by user or driver operation and optionally through use of an alignment system, such as discussed with respect to FIG. 3.

The optimal configuration of the system may subsequently be determined prior to the initiation of charging to optimize the transfer of power to the wireless power receiver battery unit. At block 802, one or more parameters of the system are measured that enable a determination of a configuration for delivering power optimally. Any parameter or combination of parameters may be measured that enable the level of coupling between the primary and secondary inductors to be determined. For example, the short circuit current across the secondary inductor may be measured, which may allow the level of coupling to be determined for a given current in the primary inductor. The current in the primary inductor may additionally or alternatively be measured if it may not already be known, such as through default settings in the system. Other parameters that are indicative of the coupling between the primary and secondary coils may also or instead be measured. The measured parameters are sent to a controller or other suitable processing device, for example, the wireless power receiver controller 344 as shown in FIG. 3.

At block 803, the measured parameters are used to determine the configuration of the wireless power transfer system for the present charging event. In exemplary embodiments, the configuration of capacitive elements in the wireless power receiver charging system circuit is selected in order to deliver a required output current to the load. In some embodiments, this is determined in conjunction with a determination of the optimal current in the base inductor such that power is transferred most efficiently. Appropriate logic may be used to determine the configuration of the system in view of the value of the measured parameters of the system compared to one or more predetermined thresholds, for instance.

In the example of FIG. 6, there are two switching configurations available to choose from that maintain the reactance of the tuning circuit, each resulting in a different output current. If the measurement of the system parameters determines that the level of coupling between the primary and secondary inductors is greater than a predetermined threshold value, switch 606 may be closed and switch 607 opened. This causes the circuit to take the configuration resulting in the lower selectable output current. Since the coupling is at a high level, this enables the required output current to be delivered with a relatively low base current. If the measurement of the system parameters determines that the level of coupling between the primary and secondary inductors is less than a predetermined threshold value, switch 606 may be opened and switch 607 closed. This causes the circuit to take the configuration resulting in the higher selectable output current. In this situation, the coupling is at a low level, thus enabling the required output current to be delivered with a relatively lower base current than would be necessary if the receiver circuit was operating in the lower current configuration, which could result in a base current being at a level that may be detrimental to the system and its efficiency.

At block 804, the system is configured according to the determination at block 803. In some embodiments, the wireless power receiver controller 344 as shown in FIG. 3 is operable to configure the switches in the wireless power receiver charging system circuit at block 804*a*. The base charging system controller 342 may also configure the base charging system as appropriate to obtain the selected base inductor current, for example, by appropriate switching at block 804*b*.

At block 805, once the configuration of the system has been set, power is delivered to the wireless power receiver battery unit.

In some embodiments, method 800 is carried out at the start of a charging event, where the configuration is set for the duration of the charging. This method may assume the same configuration remains optimal over the course of a charging event. In other embodiments, repeated configuration checks may be performed, for example, by running method 800 periodically or in response to triggering events, such as messages from the base charging system controller 342. The transition from block 805 to block 802 is illustrated by dotted line 806 in FIG. 8.

In some embodiments, a configuration check, such as illustrated in FIG. 8, may be performed dynamically at the same time as power is delivered. The configuration may be continuously checked for optimal delivery of power. In such embodiments, relays or other switching elements, such as MOSFETs or IGBTs, may be used as switching elements.

Figure 9:
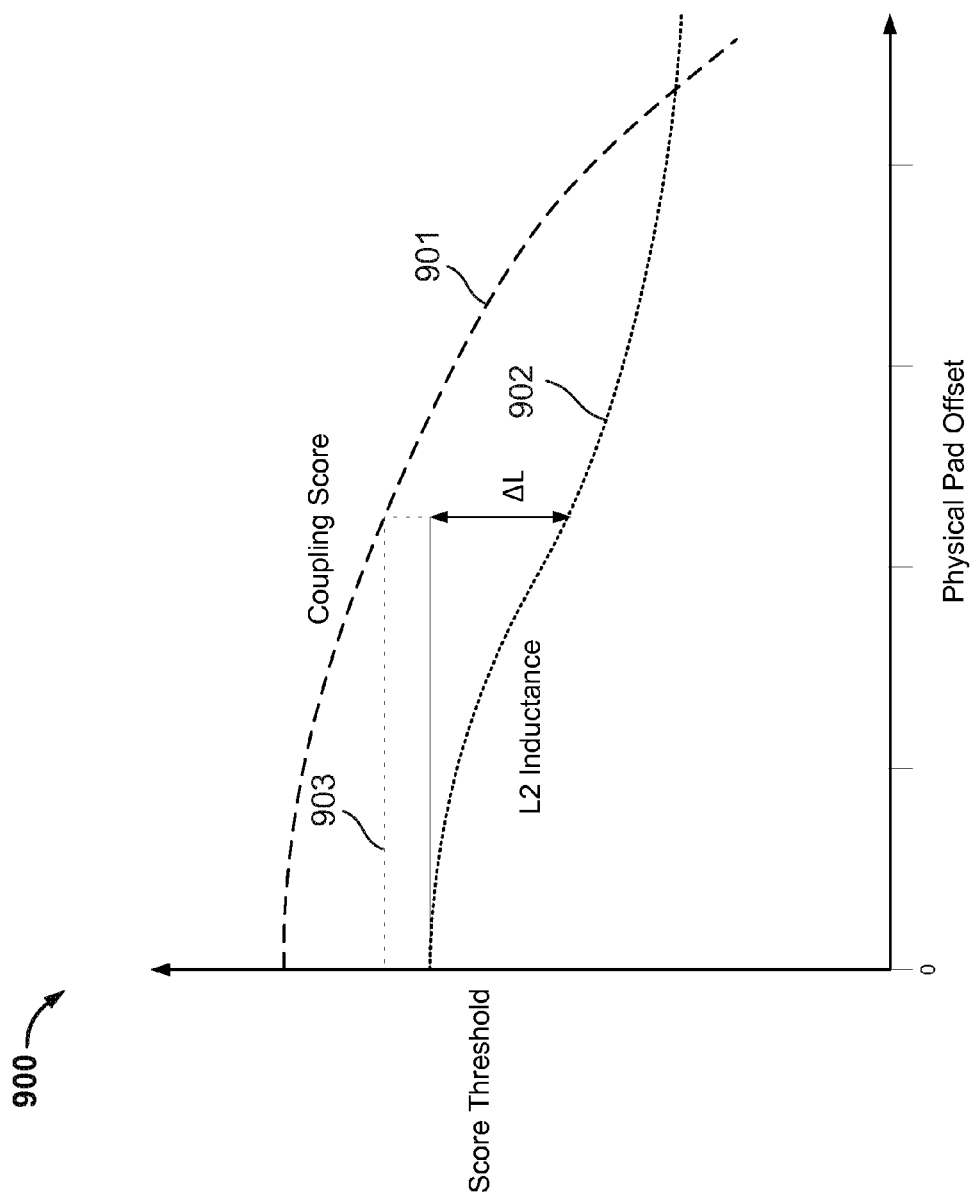
FIG. 9 is a graph illustrating characteristics of an exemplary wireless power transfer system.

FIG. 9 is a graph 900 illustrating characteristics of an exemplary wireless power transfer system. Line 901 illustrates the relationship between the level of coupling between the primary and secondary inductors in a wireless power transfer system, such as that illustrated in FIG. 4, and the offset of the two inductors. When the offset is zero, the inductors are perfectly aligned. Line 902 illustrates the relationship between the inductance of the secondary inductor and the offset of the two inductors.

As can be seen from graph 900, as the two inductors are less aligned (and the offset gets larger), the coupling between the inductors reduces and the inductance of the secondary inductor reduces. Both the level of coupling and the inductance of the secondary inductor are optimal when the inductors are perfectly aligned. If a coupling level threshold is defined (shown by line 903 in FIG. 9), it can be seen that, at the offset at which the coupling falls below this threshold, there is a difference in inductance $\Delta L$ between the inductance of the secondary inductor at that offset and the inductance of the secondary inductor at perfect alignment. In some embodiments, the capacitor switching circuit may be designed to account for this difference in inductance.

Figure 10:
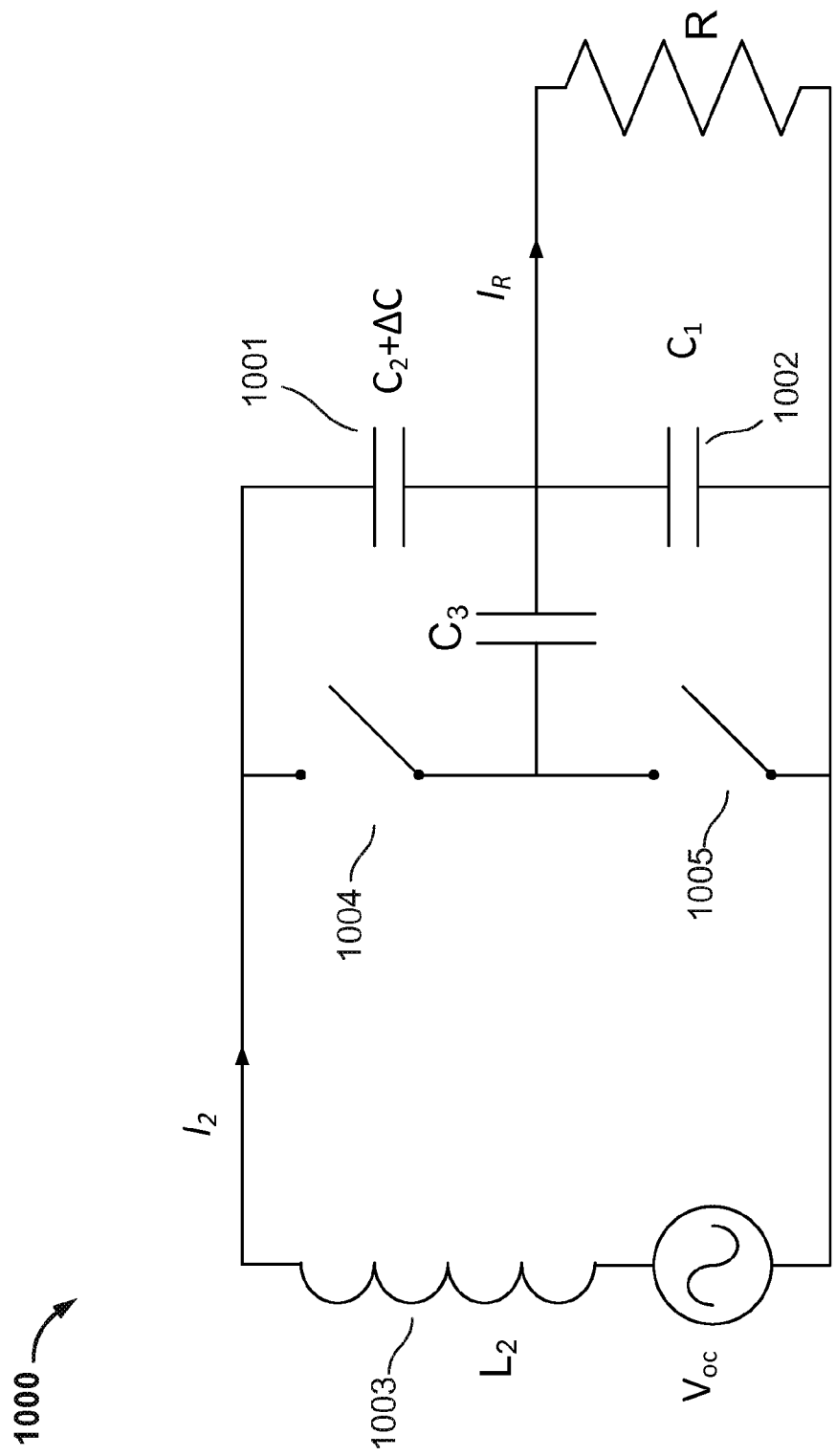
FIG. 10 is a schematic diagram of a wireless power receiver charging system circuit according to an exemplary embodiment.

FIG. 10 is a schematic diagram of a wireless power receiver charging system circuit 1000 according to an exemplary embodiment. The circuit 1000 is similar to that of FIG. 6 except capacitor 1001 has capacitance $C_2+\Delta C$ instead of $C_2$, where $C_1=C_2$ and $\Delta C \neq 0$. The capacitance of capacitor 1002, across which the output current $I_R$ is drawn, is $C_1$. With a small difference between the capacitances of capacitors 1001 and 1002, the circuit can be tuned for slightly different inductances of secondary inductor 1003 depending on whether switches 1004 and 1005 are open or closed. Switches 1004 and 1005 may be controlled by a controller (not shown) similar to controller 610 illustrated in FIG. 6.

Figure 11:
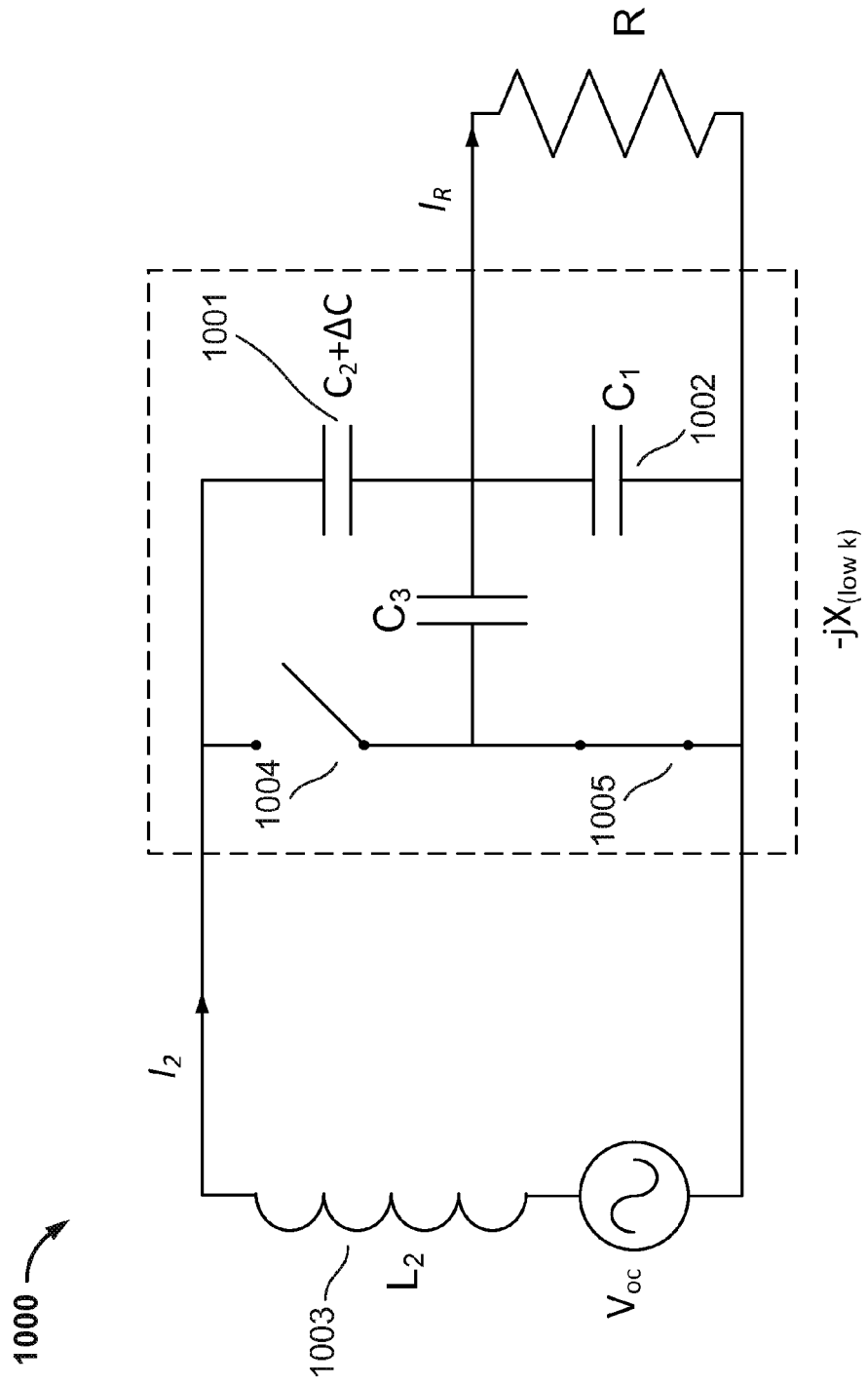
FIG. 11 is a schematic diagram of the circuit shown in FIG. 10 in a first configuration.

FIG. 11 is a schematic diagram of the circuit 1000 shown in FIG. 10 with switch 1004 open and switch 1005 closed. This corresponds to the situation in which the primary and secondary inductors are misaligned to the point that the coupling coefficient is below a threshold for setting the circuit 1000 into the higher output current mode. As such, the controller may open switch 1004 and close switch 1005. In this example, secondary inductor 1003 has an inductance $L_2$. The reactance of the capacitor switching circuit shown in FIG. 11 may be given by Equation 11.

$$X_{low\ k} = \left( \frac{C_1 + C_2 + \Delta C + C_3}{\omega(C_1 + C_3)(C_2 + \Delta C)} \right) \quad \text{Equation 11}$$

Figure 12:
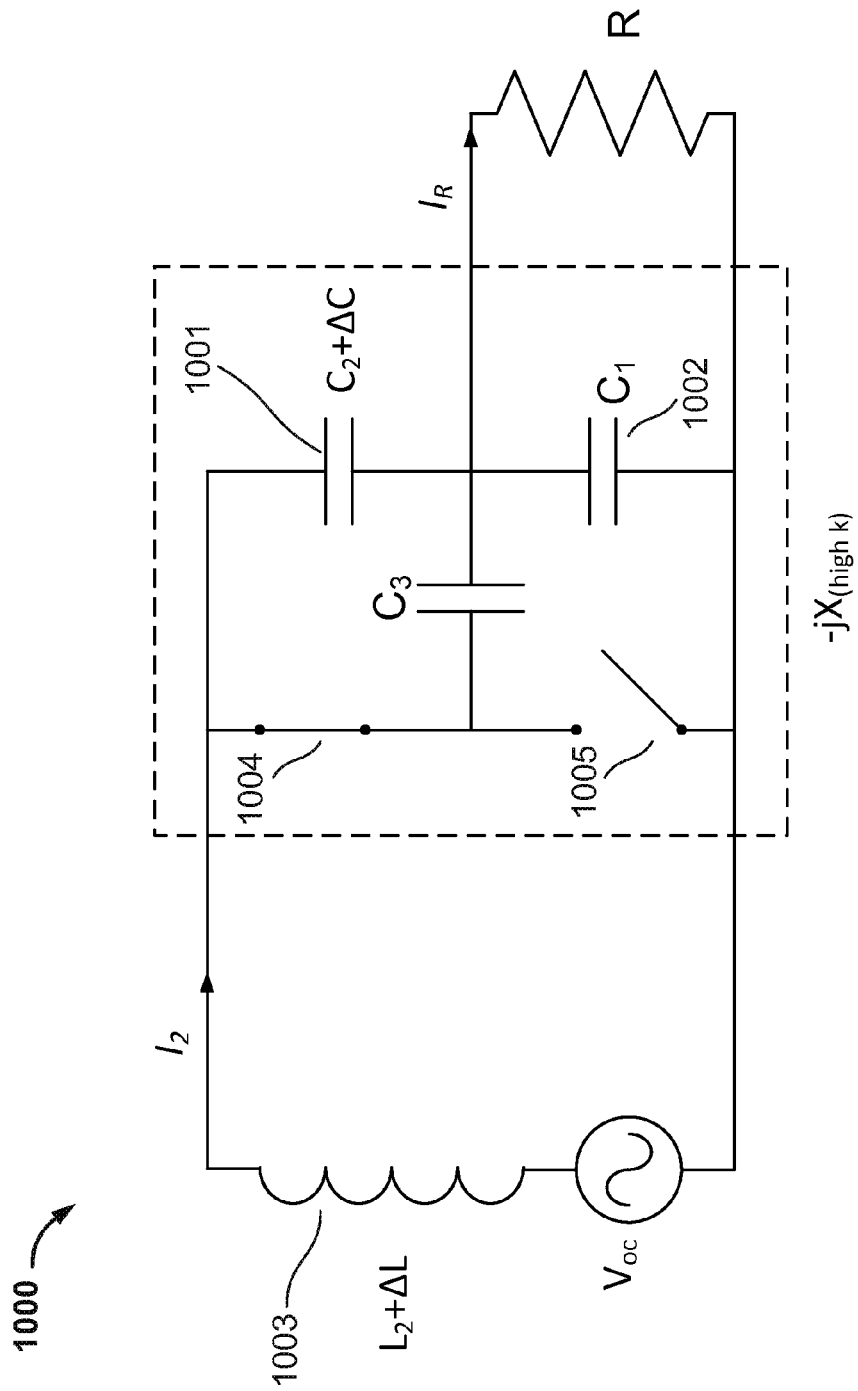
FIG. 12 is a schematic diagram of the circuit shown in FIG. 10 in a second configuration.

FIG. 12 is a schematic diagram of the circuit 1000 shown in FIG. 10 with switch 1004 closed and switch 1005 open. This corresponds to the situation in which the primary and secondary inductors are well aligned so the coupling coefficient is above a threshold for setting the circuit 1000 into the higher output current mode. In this example, secondary inductor 1003 has an inductance $L_2+\Delta L$, being higher than the inductance of the same inductor in the situation depicted in FIG. 11 in accordance with the trend shown in the graph in FIG. 9. The reactance of the capacitor switching circuit shown in FIG. 12 may be given by Equation 12.

$$X_{high\ k} = \left( \frac{C_1 + C_2 + \Delta C + C_3}{\omega(C_2 + \Delta C + C_3)C_1} \right) \quad \text{Equation 12}$$

The difference between the two reactances may be given by Equation 13.

$$\Delta X_c = X_{high\ k} - X_{low\ k} \quad \text{Equation 13}$$

In some embodiments, the value of $\Delta C$ may be selected to tune out variation in the inductance of the secondary inductor 1003 as alignment between the primary and secondary inductors varies. In some embodiments, the value of $\Delta C$ is pre-configured based on measurements of given system inductances and expected operating ranges. The value of $\Delta C$ may be set to improve tuning at a desired point in the range of coupling levels likely to be encountered. In some embodiments, $\Delta C$ may be able to vary real-time under the control of a suitable control device.

The circuit 1000, in which the capacitors 1001 and 1002 have capacitances differing by a value $\Delta C$, may be generalized to a circuit including a plurality of such sub-circuits connected in parallel, analogously to circuit 700 shown in FIG. 7. The more sub-circuits may provide a greater ability to tailor the tuning of the circuit to a variability of the secondary inductance as an offset between inductors varies.

Figure 13:
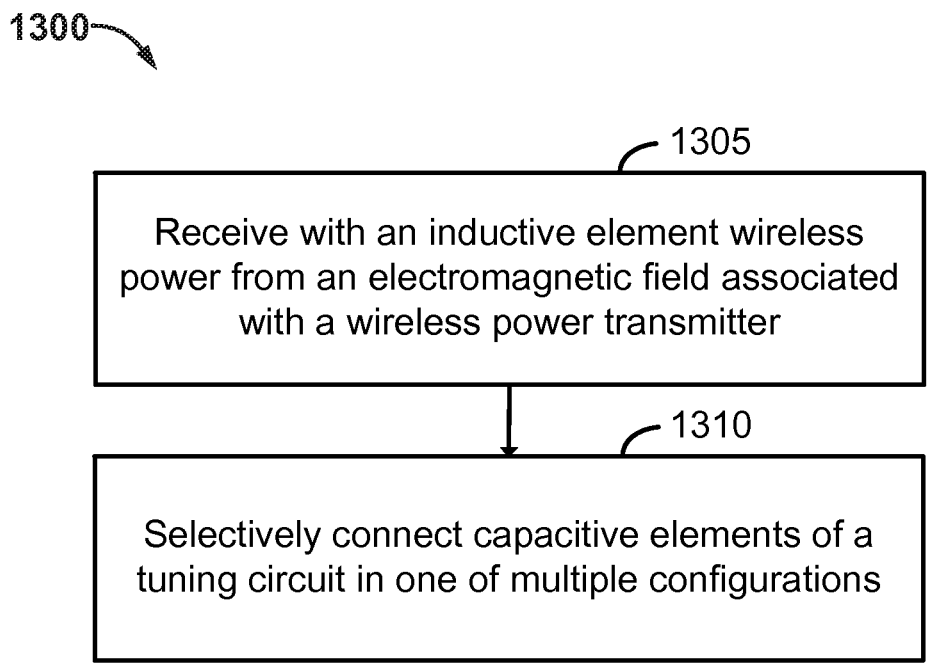
FIG. 13 is a flowchart of an exemplary method of operating a wireless power receiver.

FIG. 13 is a flowchart of an exemplary method 1300 of operating a wireless power receiver. The method 1300 may be performed using the wireless power receiver charging system circuit 600 of FIG. 6, for example. Although method 1300 is described below with respect to the elements of the wireless power receiver charging system circuit 600, other components may be used to implement one or more of the steps.

At block 1305, wireless power is received with an inductive element from an electromagnetic field associated with a wireless power transmitter. The inductive element 601 may correspond to the inductive element.

At block 1310, capacitive elements of a tuning circuit are selectively connected in one of multiple configurations. The capacitive elements are electrically connected to the inductive element. In some aspects, the tuning circuit may have substantially the same reactance in each of the multiple configurations. The capacitive elements may be configured to supply an output current to a load. The controller 610 may be configured to selectively connect the capacitive elements in the multiple configurations.

Figure 14:
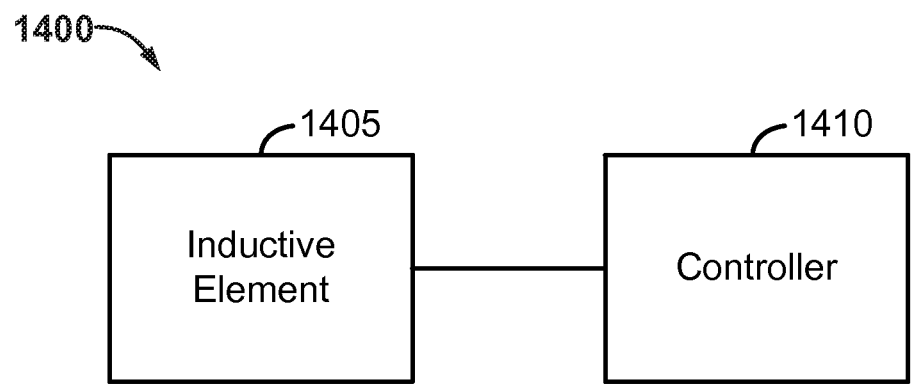
FIG. 14 is a functional block diagram of an exemplary wireless power receiver.

FIG. 14 is a functional block diagram of an exemplary wireless power receiver 1400. The wireless power receiver 1400 includes an inductive element 1405 and a controller 1410. The inductive element 1405 may be configured to perform one or more of the functions discussed with respect to block 1305 of FIG. 13. The inductive element 1405 may correspond to the inductive element 601 of FIG. 6, for instance. The controller 1410 may be configured to perform one or more of the functions discussed with respect to block 1310 of FIG. 13. The controller 1410 may correspond to the controller 610 of FIG. 6, for instance.

Moreover, in one aspect, means for receiving wireless power from an electromagnetic field may comprise the inductive element 1405. In another aspect, means for selectively connecting a plurality of capacitive elements in a plurality of configurations may comprise the controller 1410.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a wireless power receiver or remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other wireless power receivers that may be at least partially powered using a chargeable energy storage device are also contemplated (for example, electronic devices such as personal computing devices, home appliances, and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver comprising:
    an inductive element configured to receive wireless power from an electromagnetic field associated with a wireless power transmitter;
    a circuit comprising a plurality of capacitive elements connected to the inductive element, the plurality of capacitive elements configured to supply an output current to a load; and
    a controller configured to selectively connect the plurality of capacitive elements to the inductive element in a plurality of configurations, the plurality of capacitive elements presenting substantially a same total reactance to the inductive element in each of the plurality of configurations, each of the plurality of capacitive elements contributing to the total reactance in each of the plurality of configurations, and each of the plurality of configurations providing a different output current to the load for a given base current in a primary inductor of the wireless power transmitter.

2. The wireless power receiver of claim 1, wherein the controller is further configured to selectively connect the plurality of capacitive elements in the plurality of configurations in order to vary the output current to the load.

3. The wireless power receiver of claim 1, wherein the circuit comprises one or more sub-circuits, each sub-circuit comprising a subset of the plurality of capacitive elements selectively connectable in at least two configurations, the sub-circuits connected to each other in parallel.

4. The wireless power receiver of claim 3, wherein each sub-circuit comprises:
    first, second, and third capacitive elements; and
    first and second switching elements,
    wherein the first and third capacitive elements are connected in parallel with each other and in series with the second capacitive element in a first switching configuration, and the second and third capacitive elements are connected in parallel with each other and in series with the first capacitive element in a second switching configuration.

5. The wireless power receiver of claim 4, wherein the capacitance of the first and second capacitive elements are substantially the same.

6. The wireless power receiver of claim 4, wherein the capacitance of the first capacitive element is greater than the capacitance of the second capacitive element.

7. The wireless power receiver of claim 1, further comprising a parameter measurer configured to measure a wireless power transfer parameter, wherein the controller is further configured to determine a first configuration of the plurality of capacitive elements based on the measured wireless power transfer parameter and to connect the plurality of capacitive elements in the first configuration.

8. The wireless power receiver of claim 7, wherein the parameter measurer is configured to measure a level of coupling between the inductive element and a second inductive element, the second inductive element configured to generate the electromagnetic field.

9. The wireless power receiver of claim 7, wherein the parameter measurer is configured to measure a short circuit current across the inductive element.

10. A method for receiving wireless power comprising:
    receiving with an inductive element wireless power from an electromagnetic field associated with a wireless power transmitter; and
    selectively connecting a plurality of capacitive elements of a circuit to the inductive element in one of a plurality of configurations, the circuit comprising the plurality of capacitive elements connected to the inductive element, the plurality of capacitive elements presenting substantially a same total reactance to the inductive element in each of the plurality of configurations, each of the plurality of capacitive elements contributing to the total reactance in each of the plurality of configurations, each of the plurality of configurations providing a different output current to the load for a given base current in a primary inductor of the wireless power transmitter, and the plurality of capacitive elements configured to supply an output current to a load.

11. The method of claim 10, wherein the output current is configured to be different in each of the plurality of configurations.

12. The method of claim 10, wherein the plurality of capacitive elements comprise one or more sub-circuits, each sub-circuit comprising a subset of the plurality of capacitive elements connectable in at least two configurations, the sub-circuits connected to each other in parallel.

13. The method of claim 12, wherein each sub-circuit comprises:
    first, second, and third capacitive elements; and
    first and second switching elements,
    wherein the first and third capacitive elements are connected in parallel with each other and in series with the second capacitive element in a first switching configuration, and the second and third capacitive elements are connected in parallel with each other and in series with the first capacitive element in a second switching configuration.

14. The method of claim 13, wherein the capacitance of the first and second capacitive elements are substantially the same.

15. The method of claim 13, wherein the capacitance of the first capacitive element is greater than the capacitance of the second capacitive element.

16. The method of claim 10, further comprising:
    measuring a wireless power transfer parameter;
    determining a first configuration of the plurality of capacitive elements based on the measured wireless power transfer parameter; and
    connecting the plurality of capacitive elements in the first configuration.

17. The method of claim 16, wherein said measuring the wireless power transfer parameters comprises measuring a level of coupling between the inductive element and a second inductive element, the second inductive element configured to generate the electromagnetic field.

18. The method of claim 16, wherein said measuring the wireless power transfer parameters comprises measuring a short circuit current across the inductive element.

19. A wireless power receiver comprising:
   means for receiving wireless power from an electromagnetic field associated with a wireless power transmitter; and
   means for selectively connecting a plurality of capacitive elements of a circuit to the inductive element in one of a plurality of configurations, the circuit comprising the plurality of capacitive elements connected to the means for receiving wireless power, the plurality of capacitive elements presenting substantially a same total reactance to the inductive element in each of the plurality of configurations and each of the plurality of capacitive elements contributing to the total reactance in each of the plurality of configurations, each of the plurality of configurations providing a different output current to the load for a given base current in a primary inductor of the wireless power transmitter, and the plurality of capacitive elements configured to supply an output current to a load.

20. The wireless power receiver of claim 19, wherein the circuit comprises one or more sub-circuits, each sub-circuit comprising a subset of the plurality of capacitive elements selectively connectable in at least two configurations, the sub-circuits connected to each other in parallel.

21. The wireless power receiver of claim 20, wherein each sub-circuit comprises:
   first, second, and third capacitive elements; and
   first and second switching elements,
      wherein the first and third capacitive elements are connected in parallel with each other and in series with the second capacitive element in a first switching configuration, and the second and third capacitive elements are connected in parallel with each other and in series with the first capacitive element in a second switching configuration.

22. The wireless power receiver of claim 19, further comprising:
   means for measuring a wireless power transfer parameter, and
   means for determining a first configuration of the plurality of capacitive elements based on the measured wireless power transfer parameter.

23. A non-transitory, computer-readable medium comprising instructions that when executed cause a processor to perform a method of:
   receiving with an inductive element wireless power from an electromagnetic field associated with a wireless power transmitter; and
   selectively connecting a plurality of capacitive elements of a circuit to the inductive element in one of a plurality of configurations, the plurality of capacitive elements presenting substantially a same total reactance to the inductive element in each of the plurality of configurations and each of the plurality of capacitive elements contributing to the total reactance in each of the plurality of configurations, each of the plurality of configurations providing a different output current to the load for a given base current in a primary inductor of the wireless power transmitter, and the plurality of capacitive elements configured to supply an output current to a load.

24. A wireless power transfer system comprising:
   a transmitter comprising:
      a first inductive element; and
      a current generator configured to supply a current to the first inductive element to generate an electromagnetic field for transferring wireless power; and
   a receiver comprising:
      a second inductive element configured to receive wireless power from the electromagnetic field;
      a circuit comprising a plurality of capacitive elements connected to the second inductive element, the plurality of capacitive elements configured to supply an output current to a load; and
      a controller configured to selectively connect the plurality of capacitive elements to the first inductive element in a plurality of configurations, the plurality of capacitive elements presenting a substantially same total reactance to the inductive element in each of the plurality of configurations, each of the plurality of capacitive elements contributing to the total reactance in each of the plurality of configurations, and each of the plurality of configurations providing a different output current to the load for a given base current to the first inductive element.

* * * * *